(12) United States Patent
Chalmers et al.

(10) Patent No.: US 8,538,940 B2
(45) Date of Patent: Sep. 17, 2013

(54) IDENTIFICATION OF SHARED RESOURCES

(75) Inventors: Blair Chalmers, Newcastle (GB); Marvin R. Klein, Boston, MA (US); Dale Lane, Eastleigh (GB); James Thomas, Manchester (GB); Matthew Whitbourne, Horndean (GB); Emlyn Whittick, Powys (GB)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 12/140,305

(22) Filed: Jun. 17, 2008

(65) Prior Publication Data

US 2009/0030923 A1     Jan. 29, 2009

(30) Foreign Application Priority Data

Jul. 26, 2007    (EP) ..................................... 07113187

(51) Int. Cl.
*G06F 7/00*      (2006.01)
*G06F 17/30*     (2006.01)

(52) U.S. Cl.
USPC ............................ 707/705; 707/748; 707/751

(58) Field of Classification Search
USPC ........... 707/999.003, 999.004, 721, 732–735, 707/705, 748, 751
See application file for complete search history.

(56) References Cited

U.S. PATENT DOCUMENTS

| | | | | |
|---|---|---|---|---|
| 6,631,496 B1 * | 10/2003 | Li et al. | ................... | 707/999.102 |
| 6,691,106 B1 * | 2/2004 | Sathyanarayan | ...... | 707/999.003 |
| 6,853,982 B2 * | 2/2005 | Smith et al. | ...................... | 705/27 |
| 6,883,032 B1 * | 4/2005 | Dempski | ........................ | 709/229 |
| 7,010,547 B2 * | 3/2006 | Conrado et al. | .............. | 715/763 |
| 7,165,069 B1 * | 1/2007 | Kahle et al. | .............. | 707/999.01 |
| 2002/0010625 A1 * | 1/2002 | Smith et al. | ...................... | 705/14 |
| 2003/0126560 A1 * | 7/2003 | Kurapati et al. | .............. | 715/514 |
| 2005/0071328 A1 * | 3/2005 | Lawrence | ......................... | 707/3 |
| 2006/0200556 A1 | 9/2006 | Brave et al. | | |
| 2006/0287985 A1 * | 12/2006 | Castro et al. | ...................... | 707/3 |
| 2010/0228715 A1 * | 9/2010 | Lawrence | ..................... | 707/732 |

OTHER PUBLICATIONS

Röscheisen, M. et al, "Shared Web Annotations as a Platform for Third-Party Value-Added Information Providers," Stanford U. Comp. Science Dept., Technical Report CS-TR-97-1582.
Claypool, M. et al, "Implicit Interest Indicators," in Proc. ACM Intelligent User Interfaces Conference (IUI), Santa Fe, New Mexico, USA, Jan. 14-17, 2001, p. 33-40.
Nichols, D. M., "Implicit rating and filtering," in Proc. of 5th DELOS Workshop on Filtering and Collaborative Filtering, Budapest, Hungary, Nov. 10-12, 1997, p. 31-36.
Oard, D. W. and Kim, J., "Implicit feedback for recommender systems," in Proc. AAAI Workshop on Recommender Systems, Madison WI, USA, Jul. 1998.

* cited by examiner

*Primary Examiner* — Vincent Boccio
(74) *Attorney, Agent, or Firm* — Steven M. Greenberg, Esq.; Carey, Rodriguez, Greenberg & O'Keefe

(57) ABSTRACT

A method for identifying relevant shared resources for a requested browser criterion, the method comprising the steps of: receiving browser monitoring data for a shared resource, the browser monitoring data including an identification of a browser criterion; recording the browser monitoring data to a monitoring data store; parsing the monitoring data in the monitoring data store to identify relevant monitoring data for the requested browser criterion; and identifying shared resources associated with the relevant monitoring data.

18 Claims, 5 Drawing Sheets

IDENTIFICATION OF SHARED RESOURCES

CROSS-REFERENCE TO RELATED APPLICATIONS

This application is a Submission Under 35 U.S.C. §119(a) for claiming priority to European Patent Application Serial Number EP07113187.4 filed 26 Jul. 2007 the entirety of which are incorporated herein by reference.

FIELD OF THE INVENTION

The present invention relates to the identification of shared resource. In particular, it relates to the identification of relevant shared resources for a browser.

BACKGROUND OF THE INVENTION

Shared resources, such as web content, are reputedly difficult to navigate where the quantity and quality of such resources is vast and diverse. For example, researching a particular topic through a vast collection of websites can be time consuming and of variable effectiveness. Search engines provide facilities for identifying relevant search terms in large shared resource repositories, although the usefulness of search results can vary significantly. Users can rate sites relating to a particular topic or activity in order to provide feedback to other users. However, such rating requires a conscious proactive effort on the part of the user to review and evaluate shared resources and provide the feedback. Ill-considered or inadequately expressed feedback can be unhelpful and sometimes misleading.

The website "del.icio.us" provides a personal bookmarking site offering users a facility for bookmarking websites of interest. Bookmarked sites can be associated with tags to aid retrieval. Grouping of sites is possible by collecting all sites with common tags. In this way, the "del.icio.us" facility relies on the subjective interpretation of the relevance of a site to a particular topic by a user, and further requires the user to take a proactive approach.

It would therefore be advantageous to provide for the identification of relevant shared resources for a requested topic or activity without requiring proactive participation of users and without depending on a subjective assessment of a user.

SUMMARY OF THE INVENTION

The present invention accordingly provides, in a first aspect, a method for identifying relevant shared resources for a requested browser criterion, the method comprising the steps of: receiving browser monitoring data from one or more shared resource browsers, the browser monitoring data including an identification of a browser criterion; recording the browser monitoring data to a monitoring data store; parsing the monitoring data in the monitoring data store to identify relevant monitoring data for the requested browser criterion; and identifying shared resources associated with the relevant monitoring data.

In this way the present invention provides for the collection and recording of objective monitor data from browsers for a particular browser criterion. Monitoring data relevant to a requested browser criterion can then be identified, such as by comparison of a recorded browser criterion for items of monitoring data with the requested browser criterion. Shared resources associated with the relevant monitoring data are then identified. Thus the method provides recommendations of appropriate and relevant shared resources (such as websites) for a particular requested browser criterion (such as a topic or activity) based on received monitoring data from other shared resource browsers.

The present invention accordingly provides, in a second aspect, apparatus for identifying relevant shared resources for a requested browser criterion, the apparatus comprising: means for receiving browser monitoring data for a shared resource, the browser monitoring data including an identification of a browser criterion; means for recording the browser monitoring data to a monitoring data store; means for parsing the monitoring data in the monitoring data store to identify relevant monitoring data for the requested browser criterion; and means for identifying shared resources associated with the relevant monitoring data.

The present invention accordingly provides, in a third aspect, an apparatus comprising: a central processing unit; a memory subsystem; an input/output subsystem; and a bus subsystem interconnecting the central processing unit, the memory subsystem, the input/output subsystem; and the apparatus as described above.

The present invention accordingly provides, in a fourth aspect, a computer program element comprising computer program code to, when loaded into a computer system and executed thereon, cause the computer to perform the steps of a method as described above.

BRIEF DESCRIPTION OF THE DRAWINGS

A preferred embodiment of the present invention is described below in more detail, by way of example only, with reference to the accompanying drawings, in which.

DETAILED DESCRIPTION OF THE PREFERRED EMBODIMENTS

Figure 1:
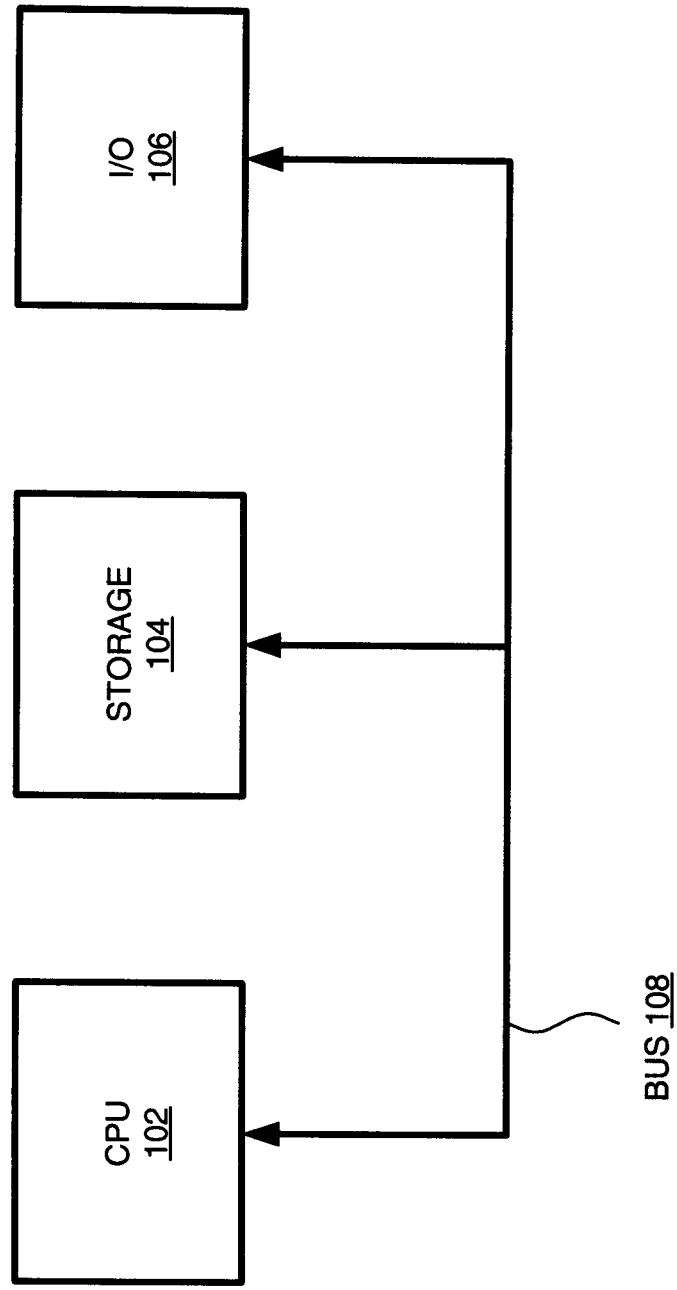
FIG. 1 is a block diagram of a computer system suitable for the operation of embodiments of the present invention.

FIG. 1 is a block diagram of a computer system suitable for the operation of embodiments of the present invention. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
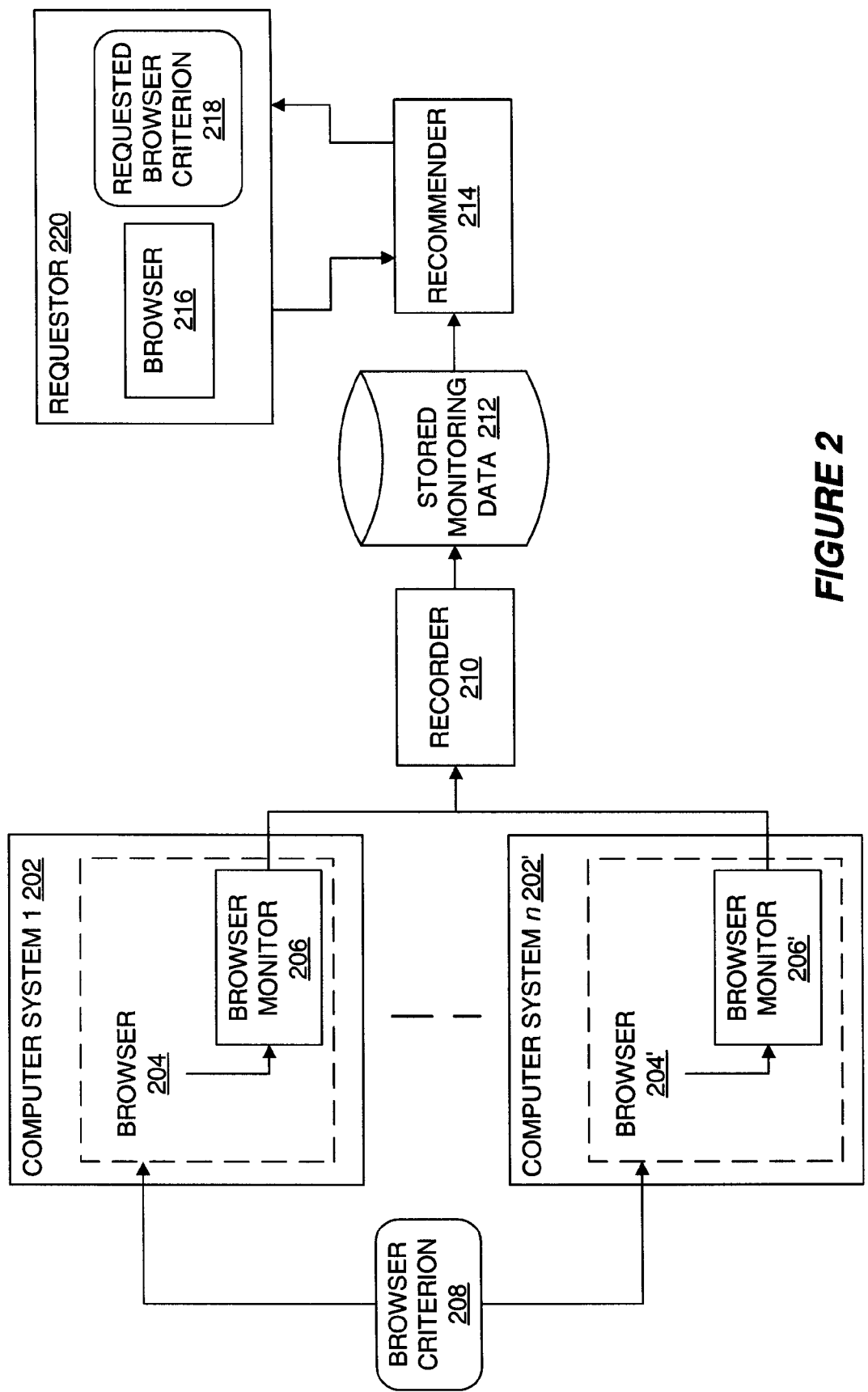
FIG. 2 is a schematic illustration of the components suitable for identifying relevant shared resources for a requested browser criterion in accordance with a preferred embodiment of the present invention.

FIG. 2 is a schematic illustration of the components suitable for identifying relevant shared resources for a requested browser criterion 218 in accordance with a preferred embodiment of the present invention. Computer systems 202, 202' each include a browser 204, 204' suitable for accessing and browsing shared resources. For example, browsers 204, 204' can be web browsers suitable for accessing internet websites using the hypertext transport protocol, as are well known in the art. The browsers 204, 204' are operated by users in pursuit of a goal represented as a browser criterion 208. For example, users may use the browsers to search, research, analyse, experiment or study. Each such activity can constitute a browser criterion 208. Alternatively, the browser criterion 208 may relate to a specific subject matter or topic of activity. For example, the browser criterion 208 may relate to financial information, geographical information, historical information or literature. Each such topic can also constitute a browser criterion 208. The browser criterion 208 for each of the browsers 204, 204' is recorded in such a way that it may be recited by each browser 204, 204', such as by outputting it to a user or by transmission.

Each of browsers 204, 204' has associated a browser monitor 206, 206' which is a software or hardware component operable to monitor the browser 204, 204' to generate browser monitoring data for a shared resource browsed by the browser 204, 204'. For example, browser monitor 206, 206' is a web browser plugin. Browser monitoring data is data that is useful in informing a determination as to whether a particular shared resource browsed by the browser 204, 204' is relevant to the browser criterion 208 for the browser. For example, if browser 204 is browsing a website for the browser criterion 208 "geographical information" and a user finds that the website is not particularly relevant to that browser criterion 208, the user may undertake certain actions expressing this lesser relevance. Such actions can include, for example, swiftly navigating to an alternative website. On the other hand, the user may find that a browsed website is particularly relevant to the browser criterion 208 and may undertake actions expressing this greater relevance. Such actions may include actively using the information in the website. Thus, in this example, such actions are useful in informing a determination a to whether the browsed website is relevant to the browser criterion 208. Browser monitoring data can include any or all of: data relating to interaction between a user and the browser 204, 204' (such as a web browser); data relating to interaction between a user and a shared resource (such as a website); and data relating to a reuse of resources at a shared resource (such as a website). Each of these is considered in more detail below. The browser monitoring data is recorded by a recorder 210 as stored monitoring data 212 in a monitoring data store. The recorder 210 receives the browser monitoring data from the browser monitor 206, 206'. Browser monitoring data is received for a particular shared resource browsed by the browser 204, 204' and includes an indicator of the browser criterion 208 for the browser 204, 204'.

In some embodiments, the browser monitor 206, 206' can generate monitoring data relating to interaction between a user and the browser 204, 204' (such as a web browser). Such data can reflect user interface actions undertaken by the user, such as selecting options on the browser screen including forward, backward and stop buttons, for example. Such actions can be useful in informing a determination as to whether a particular shared resource browsed by the browser 204, 204' is relevant to the browser criterion 208 for the browser. For example, a user action of paging backwards from a browsed website using a backward button on a browser may indicate that the website is of lesser relevance. Other data relating to interaction between a user and the browser 204, 204' can include data relating to the specification of an address of a shared resource by the user. For example, a user may specifically input a website address into the browser 204, 204' and this can be informative as to the relevance of the website to the browser criterion 208. Further, data relating to interaction between a user and the browser 204, 204' can include data relating to the storage or retrieval of a bookmark or "hotlink" to a shared resource—such as an address of a website—by the user. Yet further, data relating to interaction between a user and the browser 204, 204' can include data relating to the selection of a link in shared resource—such as a hypertext link in a website—by a user.

In some embodiments, the browser monitor 206, 206' can generate monitoring data relating to interaction between a user and a shared resource (such as a website). Such data can reflect user actions undertaken with respect to a shared resource itself and can include, for example: an elapsed period of time a user spends browsing the shared resource; data transmitted to the shared resource (such as data input into fields in a website and submitted to the webserver); and data relating to the selection of a link in a shared resource—such as a hypertext link in a website—by a user.

In some embodiments, the browser monitor 206, 206' can generate monitoring data relating to a reuse of resources at a shared resource (such as a website). Reuse of resources can include, for example, copying or downloading such resources, such as text or other media, from a website. Such copying can include cutting, copying or pasting using a clipboard function of the computer system 202, 202'. Such actions can be most useful in informing a determination as to whether a particular shared resource browsed by the browser 204, 204' is relevant to the browser criterion 208 for the browser. For example, a user browsing a website having particularly relevant content may copy the content for use in another application executing on the computer system 202, 202' (such as a word processing application or email application).

The stored monitoring data 212 can be recorded in any appropriate manner. For example, stored monitoring data 212 can be recorded as an extensible markup language document (XML) (XML is a registered trademark of World Wide Web Consortium, Massachusetts Institute of Technology). Such an XML document can record multiple items of monitoring data received from the browser monitor 206, 206'. Alternatively, multiple such documents can store, either singly or multiply, items of monitoring data.

The stored monitoring data 212 is accessible to a recommender 214 which is a software or hardware component operable to parse the stored monitoring data 212 to identify relevant monitoring data for a requested browser criterion 218, and to identify shared resources associated with such relevant monitoring data. In use a requester computer system 220, having a browser 216 and a requested browser criterion 218, requests that the recommender 214 identify relevant shared resources for the requested browser criterion 218. Stored monitoring data 212 including an identification of a browser criterion 208 matching the requested browser criterion 218 can be identified as relevant to the requestor browser 216. Further, such identified stored monitoring data can be examined to determine if it is of greater or lesser relevance for the requested browser criterion 218. In this way the present invention provides for the collection and recording of objective stored monitoring data 212 from browsers 204, 204' for a particular browser criterion 208. Monitoring data relevant to a requested browser criterion 218 can be identified, such as by comparison of the recorded browser criterion 208 for items of monitoring data with the requested browser criterion 218. Shared resources associated with the relevant monitoring data are then identified.

While multiple computer systems 202, 202' are illustrated in FIG. 2 it will be apparent to those skilled in the art that a single such computer system could usefully provide monitoring data for recording by the recorder 210 as stored monitoring data 212.

Further, while the browsers 204, 204' of FIG. 2 are illustrated as acting with respect to the same browser criterion 208, it will be appreciated by those skilled in the art that each browser may act in accordance with a different browser criterion and each such different browser criterion will be recorded along with, or as part of, data generated by the browser monitors 206, 206' for storage in the stored monitoring data 212. The recommender 214 is accordingly operable to identify relevant monitoring data from the stored monitoring data 212 with reference to such recorded browser criteria.

Further, while the browser monitors 206, 206' of FIG. 2 are illustrated as being integral with the browsers 204, 204', they may be separable components (such as web browser plugins) or separate components cooperating with the browsers 204, 204'.

Figure 3:
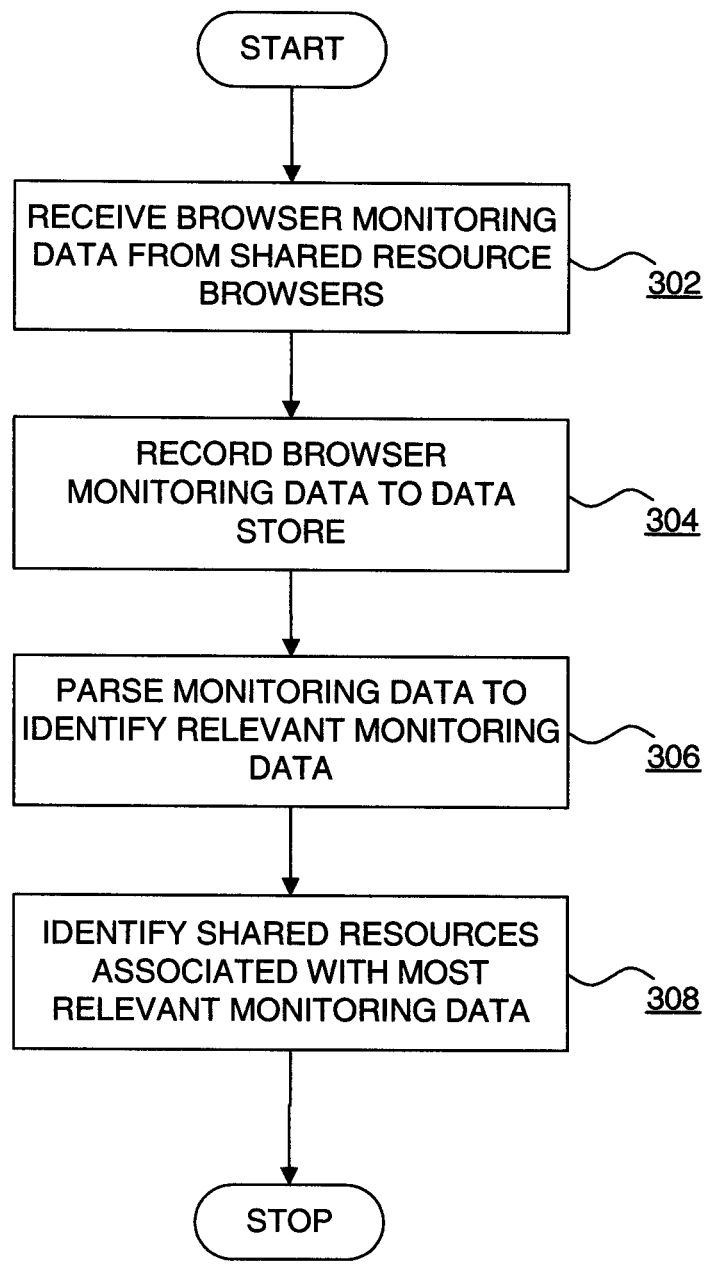
FIG. 3 is a flowchart of a method in accordance with a preferred embodiment of the present invention.

FIG. 3 is a flowchart of a method in accordance with a preferred embodiment of the present invention. Initially, at step 302, browser monitoring data for a shared resource is received from shared resource browsers 204, 204', such as via browser monitors 206, 206'. Each item of monitoring data includes an identification of the browser criterion 208. At step 304 the browser monitoring data is recorded to a data store as stored monitoring data 212. At step 306 the recommender 214 parses the monitoring data to identify monitoring data that is relevant to the requested browser criterion 218. Subsequently, at step 308, shared resources associated with the relevant monitoring data are identified. The identified shared resources are provided to the requester browser 216 so informing the requester browser 216 as to which shared resources are relevant to the requested browser criterion 218.

Figure 4:
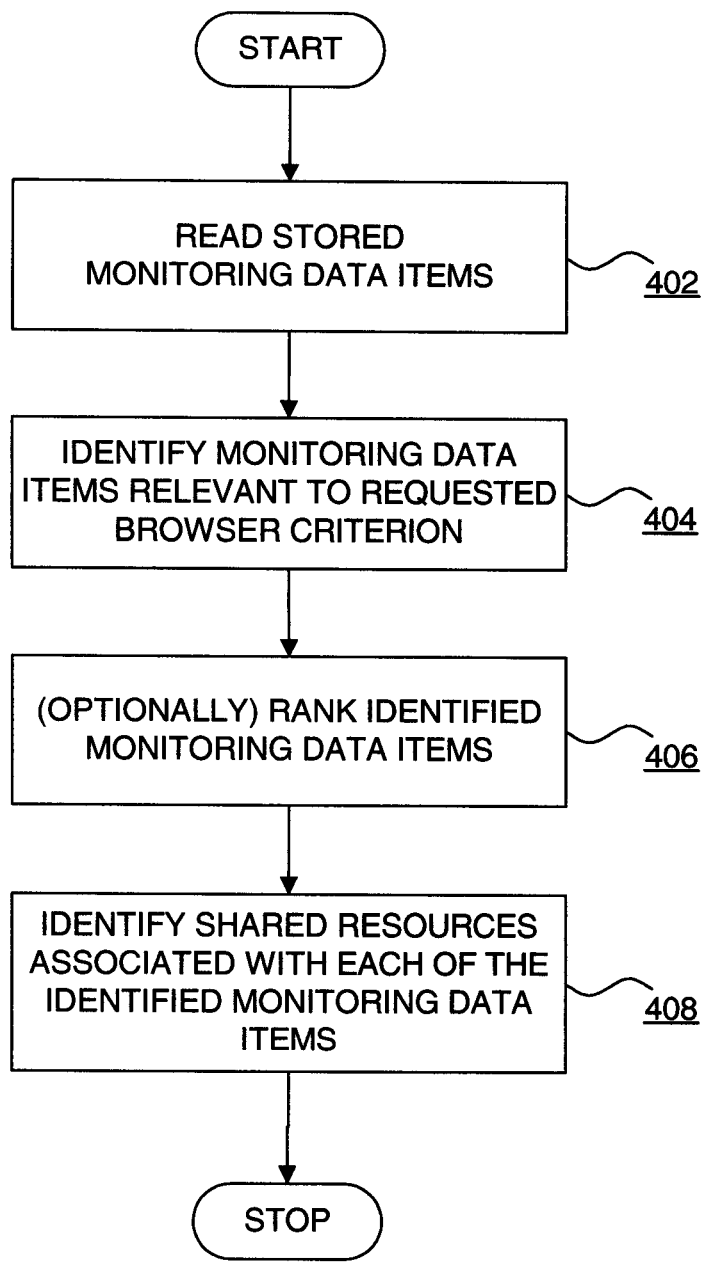
FIG. 4 is a flowchart of an exemplary method of the recommender of FIG. 2 in accordance with a preferred embodiment of the present invention.

FIG. 4 is a flowchart of an exemplary method of the recommender 214 of FIG. 2 in accordance with a preferred embodiment of the present invention. Initially, at step 402, the recommender 214 parses the stored monitoring data 212 to read stored monitoring data items. For example, the stored monitoring data items may be stored as nested elements in an XML document. At step 404 the recommender 214 identifies monitoring data items relevant to the requested browser criterion 218. Optionally, at step 406, the recommender 214 ranks the identified monitoring data items. Such ranking can be based on relative levels of relevance of the data items, and such relative relevance can be defined in a relevance policy, as would be apparent to those skilled in the art. At step 408, shared resources associated with the relevant monitoring data are identified for informing the requestor browser 216 as to which shared resources are relevant to the requested browser criterion 218.

Figure 5:
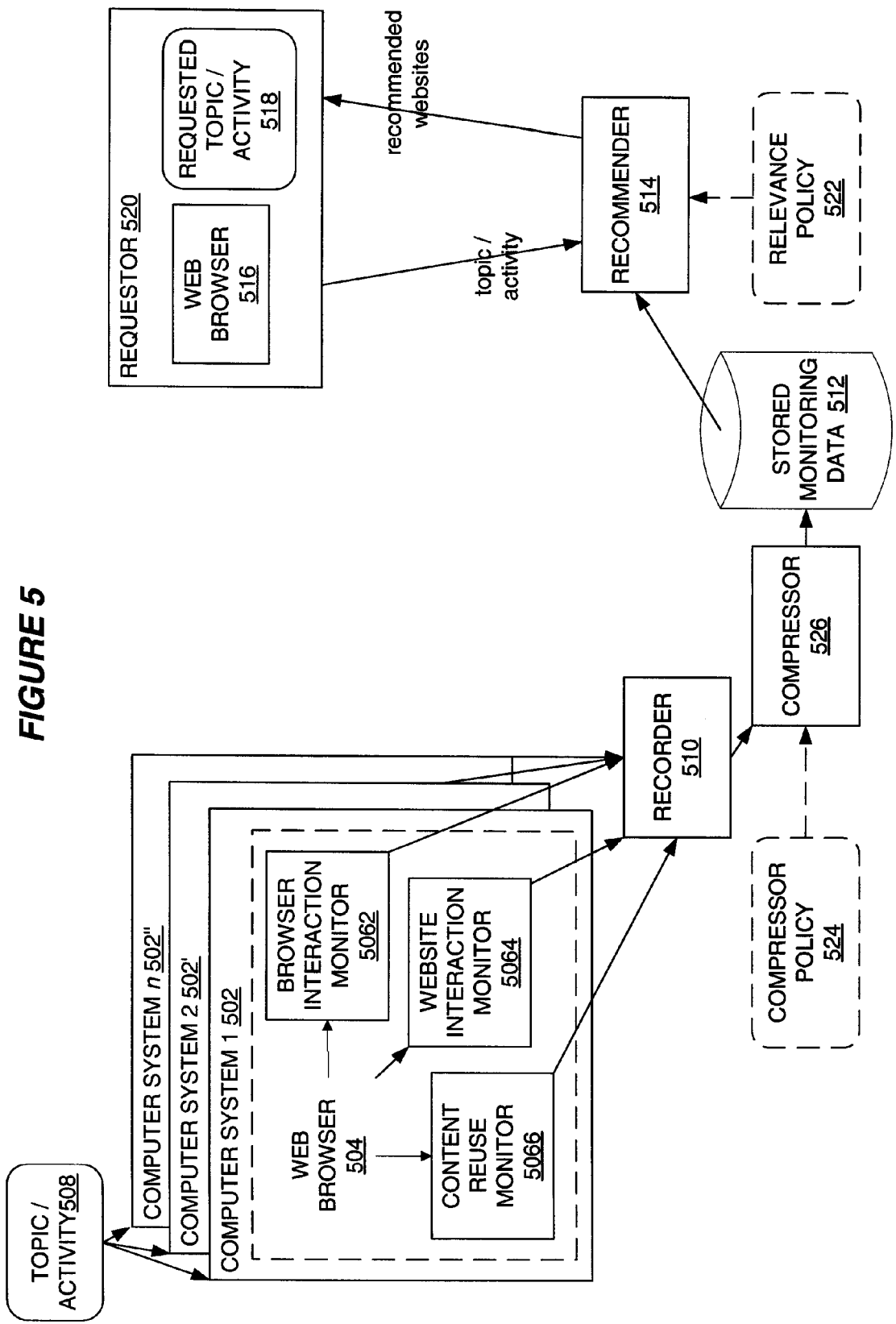
FIG. 5 is an exemplary schematic illustration of the components suitable for identifying relevant shared resources for a requested topic or activity in accordance with an alternative embodiment of the present invention.

FIG. 5 is an exemplary schematic illustration of the components suitable for identifying relevant shared resources for a requested topic or activity 518 in accordance with an alternative embodiment of the present invention. Many of the elements of FIG. 5 are consistent with elements described above with respect to FIG. 2. FIG. 5 includes multiple computer systems 502, 502' and 502" each having a web browser 504. Web browser 504 has associated: a browser interaction monitor 5062 for generating monitoring data relating to interaction between a user and the browser 504 (examples of such data are provided above with respect to FIG. 2); a website interaction monitor 5064 for generating monitoring data relating to interaction between a user and a shared resource (examples of such data are provided above with respect to FIG. 2); and a content reuse monitor for generating monitoring data relating to a reuse of resources at a shared resource (examples of such data are provided above with respect to FIG. 2). The browser 504 is associated with a topic or activity 508 which generally relates to the purpose to which the browser is put by a user.

In use, the monitors 5062, 5064, 5066 generate items of monitoring data. Each item of monitoring data is specific to a particular browsed website and includes an identification of the topic or activity 508. The monitoring data is received by the recorder 510 for recording as stored monitoring data 512. Optionally, a compressor 526 is provided as a software or hardware component suitable for compressing the monitoring data for storage as stored monitoring data 512. Preferably, the monitoring data is compressed by removal of monitoring data based on a compression policy 524. In particular, the compression policy preferably includes one or more criteria for identifying monitoring data suitable for removal before being stored as stored monitoring data 512. For example, monitoring data relating to a user accessing a particular website for less than 5 seconds may be considered generally irrelevant to an identification of helpful websites (since it may indicate that the website was not relevant to the topic or activity 508). Such monitoring data may be a good candidate for deletion from the stored monitoring data 512 so resulting in a reduced quantity of the stored monitoring data 512.

A requester 520 sends details of a topic or activity 518 requested for browsing on a web browser 516 to a recommender 514. The recommender 514 parses the stored monitoring data 512 to identify relevant monitoring data for the requested topic/activity 518, and identifies websites associated with such relevant monitoring data as recommended websites. Preferably, the recommender 514 employs a relevance policy 522 to rank such identified websites in order that the requestor browser 516 is able to ascertain a relative relevance of the identified websites. In this way the requestor browser 516 is able to browse websites of relevance to the requested topic/activity 518 based on monitoring data from the experience of web browsers 504 elsewhere. Since the monitoring is undertaken inherently as part of the browsing process by the monitors 5062, 5064, 5066, it is not necessary for users to proactively provide feedback or subjective assessments of particular websites. Thus the availability and accuracy of the monitoring data, and therefore the recommended websites, is improved.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method for recommending relevant websites for a requested browser criterion, comprising:
   monitoring a plurality of browsers used by different users;
   generating browser monitoring data for websites browsed by the plurality of browsers, the browser monitoring data including data relating to interaction between a user and a web browser, data relating to interaction between a user and a website, and data relating to a reuse of resources at a website, the reuse of resources at a website including a clipboard operation associated with content within the website;
   recording the browser monitoring data to a data store, each item of the browser monitoring data including an identification of a browser criterion relating to a specific subject matter or topic of activity;
   receiving a requested browser criterion from a requestor browser;
   parsing the stored browser monitoring data to identify monitoring data including an identification of a browser criterion matching the requested browser criterion as relevant to the requested browser criterion;
   identifying websites associated the identified relevant monitoring data; and
   recommending the identified websites to the requestor browser.

2. The method of claim 1, further comprising ranking the identified websites using a relevance policy.

3. The method of claim 1, further comprising
   compressing the generated browser monitoring data to reduce quantity of stored monitoring data by removal of monitoring data based on a compression policy.

4. The method of claim 1, wherein
   the interaction between a user and a web browser includes at least one of:
   a selecting of options in the web browser by the user,
   a specifying of an address of a website by the user,
   a storing of a bookmark to the address of the website by the user,
   a retrieving of the bookmark to the address of the website by the user, and
   a selecting of a hypertext link within the website by the user.

5. The method of claim 1, wherein
   the interaction between a user and a website includes an indication of at least one of:
   an elapsed period of time a user spends browsing the website,
   data transmitted to a web server for the website, and
   a selection of a hypertext link in the website by a user.

6. The method of claim 1, wherein
   the reuse of resources at a website further includes:
   downloading the content from the website.

7. A computer hardware device for recommending relevant websites for a requested browser criterion, comprising:
   a processor, wherein the processor is configured to
   monitor a plurality of browsers used by different users;
   generate browser monitoring data for websites browsed by the plurality of browsers, the browser monitoring data including data relating to interaction between a user and a web browser, data relating to interaction between a user and a website, and data relating to a reuse of resources at a website, the reuse of resources at a website including a clipboard operation associated with content within the website;
   record the browser monitoring data to a data store, each item of the browser monitoring data including an identification of a browser criterion relating to a specific subject matter or topic of activity;
   receive a requested browser criterion from a requestor browser;
   parse the stored browser monitoring data to identify monitoring data including an identification of a browser criterion matching the requested browser criterion as relevant to the requested browser criterion;
   identify websites associated the identified relevant monitoring data; and
   recommend the identified websites to the requestor browser.

8. The computer hardware device of claim 7, wherein the processor is further configured to
   rank the identified websites using a relevance policy.

9. The computer hardware device of claim 7, wherein the processor is further configured to
   compress the generated browser monitoring data to reduce quantity of stored monitoring data by removal of monitoring data based on a compression policy.

10. The computer hardware device of claim 7, wherein
    the interaction between a user and a web browser includes at least one of:
    a selecting of options in the web browser by the user,
    a specifying of an address of the website by the user,
    a storing of a bookmark to the address of the website by the user,
    a retrieving of the bookmark to the address of the website by the user, and
    a selecting of a hypertext link within the website by the user.

11. The computer hardware device of claim 7, wherein
    the interaction between a user and a website includes an indication of at least one of:
    an elapsed period of time a user spends browsing the website,
    data transmitted to a web server for the website, and
    a selection of a hypertext link in the website by a user.

12. The computer hardware device of claim 7, wherein
    the reuse of resources at a website further includes
    downloading the content from the website.

13. A computer program product comprising a computer usable storage memory having stored therein computer usable program code for evaluating browser monitoring data associated with a shared resource, the computer usable program code, which when executed by a computer hardware system causes the computer hardware system to perform
    monitoring a plurality of browsers used by different users;
    generating browser monitoring data for websites browsed by the plurality of browsers, the browser monitoring data including data relating to interaction between a user and a web browser, data relating to interaction between a user and a website, and data relating to a reuse of resources at a website, the reuse of resources at a website including a clipboard operation associated with content within the website;

recording the browser monitoring data to a data store, each item of the browser monitoring data including an identification of a browser criterion relating to a specific subject matter or topic of activity;

receiving a requested browser criterion from a requestor browser;

parsing the stored browser monitoring data to identify monitoring data including an identification of a browser criterion matching the requested browser criterion as relevant to the requested browser criterion;

identifying websites associated the identified relevant monitoring data; and recommending the identified websites to the requestor browser.

14. The computer program product of claim 13, further comprising
ranking the identified websites using a relevance policy.

15. The computer program product of claim 13, further comprising
compressing the generated browser monitoring data to reduce quantity of stored monitoring data by removal of monitoring data based on a compression policy.

16. The computer program product of claim 13, wherein the interaction between a user and a web browser includes at least one of:
a selecting of options in the web browser by the user,
a specifying of an address of the website by the user,
a storing of a bookmark to the address of the website by the user,
a retrieving of the bookmark to the address of the website by the user, and
a selecting of a hypertext link within the website by the user.

17. The computer program product of claim 13, wherein the interaction between a user and a website includes an indication of at least one of:
an elapsed period of time a user spends browsing the website,
data transmitted to a web server for the website, and
a selection of a hypertext link in the website by a user.

18. The computer program product of claim 13, wherein the reuse of resources at a website further includes
downloading the content from the website.

* * * * *